May 14, 1968 — O. SHAMES — 3,383,687
GROSS BEARING ERROR DETECTOR
Filed April 12, 1967 — 2 Sheets-Sheet 1

INVENTOR.
OSCAR SHAMES
BY
ATTORNEYS

United States Patent Office 3,383,687
Patented May 14, 1968

---

3,383,687
GROSS BEARING ERROR DETECTOR
Oscar Shames, Philadelphia, Pa., assignor to the United States of America as represented by the Secretary of the Navy
Filed Apr. 12, 1967, Ser. No. 630,472
6 Claims. (Cl. 343—106)

ABSTRACT OF THE DISCLOSURE

A navigation apparatus for indicating the range and bearing of a remotely located receiving station from a beacon station. The beacon station transmits a fundamental and harmonically related signal to form a complex wave shape containing a reference signal at the fundamental frequency and an auxiliary reference signal at the harmonic frequency. By making a phase comparison of the received fundamental signal with the reference signal, it is possible to obtain a coarse indication of bearing of the receiving station from the beacon station. A fine bearing indication is provided by a similar comparison with the harmonically related signals. Gross bearing error measurements are eliminated by utilizing the synchronous properties of the fundamental frequency reference signal while making the fine bearing measurement.

---

The invention described herein may be manufactured and used by or for the Government of the United States of America for governmental purposes without the payment of any royalties thereon or therefor.

Background of the invention

The present invention relates generally to improvements in navigation equipment and the like and more particularly to a new and improved bearing measurement circuit wherein gross bearing errors are eliminated.

Various forms of navigational aids have been employed by aircraft and ships to determine their position relative to a fixed reference. One such system employs an omnidirectional beacon station which radiates an amplitude modulated pulse train which supports a complex wave shape comprising a sinusoidal signal at a fundamental frequency of 15 cycles per second and a harmonically related sinusoidal signal at 135 cycles per second superimposed thereon. Also at the 15-cycle rate there are transmited pulses referenced to an established bearing reference, such as magnetic North and auxiliary pulses at 135-cycle rate dispersed therebetween. Whereas the phase of the reference signals are fixed regardless to the point of observation, neglecting the short transmission time, the phase of the 15-cycle and 135-cycle signals will vary with respect to the reference signals in accordance with the point of observation. By measurement of this phase difference, it is then possible to obtain an indication of the bearing of the observer with respect to the beacon.

The above-described system makes this bearing measurement in two steps; first, a coarse bearing measurement by the coincidence of the 15-cycle North reference signal with that of a 15-cycle variable signal and then a fine bearing measurement by the coincidence of the 135-cycle auxiliary reference signal with that of a 135-cycle variable signal. The coarse bearing measurement is performed during a search mode of operation in which the system seeks to locate the North reference signal within one of nine 40-degree bearing sectors. After having found coincidence within one of these sectors, the system switches to a track mode of operation and performs the fine bearing measurement. To make an accurate fine bearing measurement, it is therefore imperative that the correct coarse bearing sector be selected in the search mode, otherwise, the fine bearing indication may be incorrect by one or more bearing sectors. To this end, the beacon signals are specially coded so that a receiving station is able to discriminate between true North reference signals and other types of signals or noise. Although this technique is substantially effective against noise, it is completely ineffective against spurious signals having the correct coding, such as those intentionally transmitted by any enemy jammer or those received from an adjacent channel or from co-channel operation. Additionally, it is possible that due to some malfunction in the receiving station equipment or some noise condition, there are additional North reference signals produced. In this condition, if coincidence is made with the wrong North reference signal, a coarse bearing error results.

Summary of the invention

It is therefore an object of the invention to render the presence of spurious North reference signals ineffective in causing gross bearing errors. Briefly, the invention utilizes not only the special signal coding of the reference signals, but also the synchronous nature thereof. This latter feature provides increased immunity to spurious random reference signals by requiring that certain synchronous conditions exist before a fine bearing measurement is validated. Specifically, the presence of a North reference signal, a narrow gate synchronous with the 135-cycle variable signal and the absence of an auxiliary reference signal are required before a fine bearing measurement will be accepted as valid. This function is achieved by the use of a logic gate which accepts each of these signals and a coarse bearing signal and provides an output signal only when the aforementioned synchronous conditions exist.

Other objects and many of the attendant advantages of this invention will be readily appreciated as the same becomes better understood by reference to the following detailed description when considered in connection with the accompanying drawing.

Description of preferred embodiment

Figure 1:
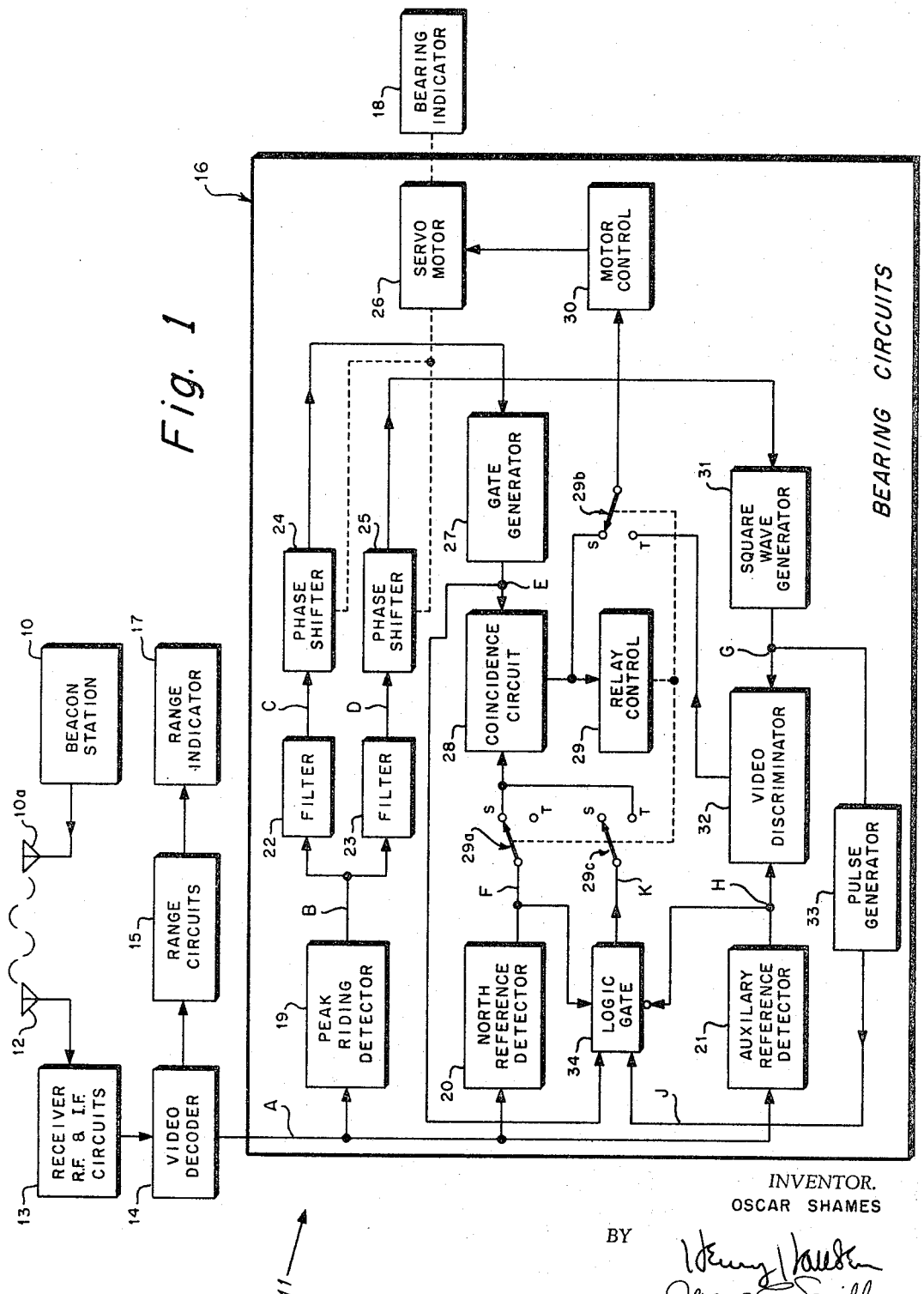
FIG. 1 shows in block diagram form an embodiment of the invention in cooperation with a navigation receiver and a beacon station.

Referring now to the drawing, there is shown in FIG. 1, a navigation beacon station 10 with an antenna 10a for radiating beacon signals to a remotely located receiving station 11. The beacon signals are received at the receiving station 11 by an antenna 12 which couples the received energy to the receiver RF and IF circuits 13 where frequency conversion and amplification of the received signals is performed. The output of this circuit is applied to a video decoder 14 which passes only properly coded beacon signals to range circuits 15 and bearing circuits 16. The output of the range circuit 15 is applied to a range indicator 17 for indicating the range of the receiving station from the beacon station. In a similar manner, a bearing indicator 18 is connected to the output of the bearing circuits 16 for indicating the bearing of the receiving station from the beacon station.

Figure 2:
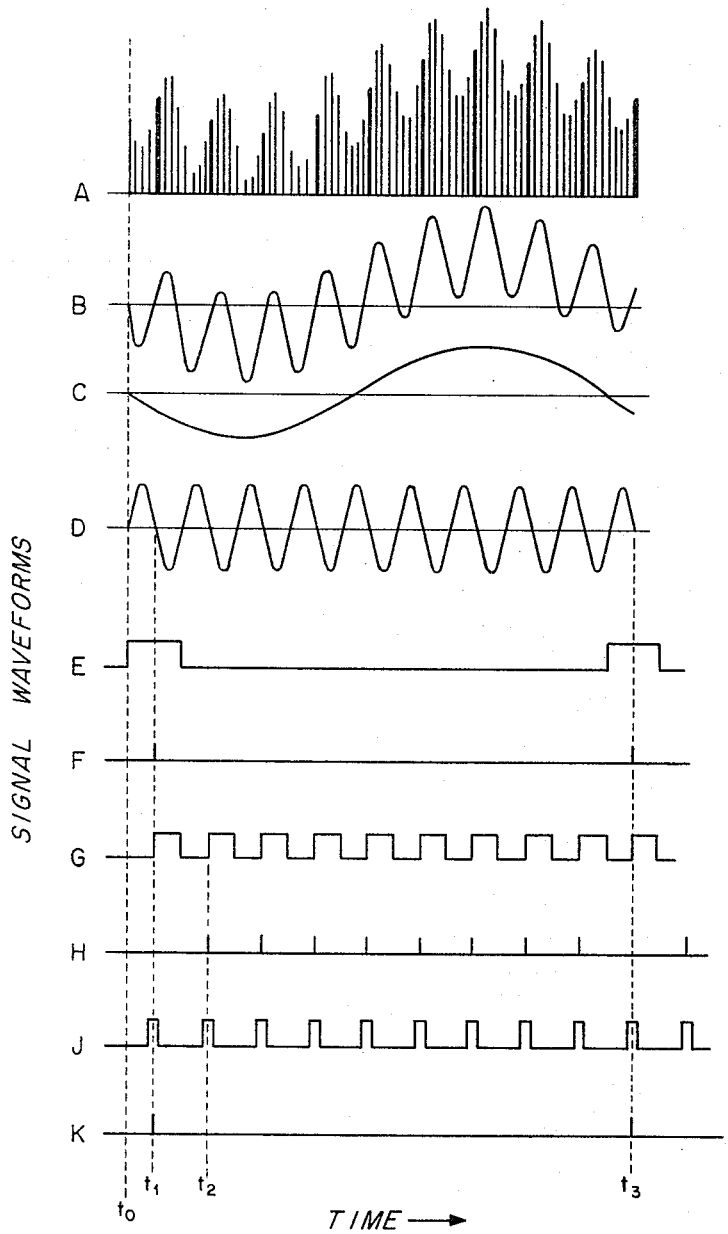
FIG. 2 illustrates signal waveforms at various points in the embodiment of FIG. 1 as a function of time.

The operation of the bearing circuits 16 can be best understood when considered in conjunction with FIG. 2 wherein there is shown on line A one cycle of a typical decoded beacon signal appearing at the output of the video decoder 14. This signal, commencing at time $t_0$ comprises a plurality of randomly spaced pulses of different amplitude which supports a complex wave-shape having a fundamental frequency, such as 15 cycles per second and a harmonically related frequency such as 135 cycles per second impressed thereon. Interspersed among the random pulses are specially coded North reference pulses appearing at a 15 cycle rate and auxiliary reference pulses at a 135 cycle rate. The output of the video decoder 14 is electrically connected to three detectors in the bearing circuits 16. The first detector is a peak riding detector 19 which detects the envelope of the complex waveshape; the output of th sicircuit is illustrated on line B of FIG. 2. The second detector is a North reference detector 20 which establishes a North reference bearing pulse as a function of the decoded signal. The output of this detector is illustrated on line F of FIG. 2 as being a pulse appearing at time $t_1$, once in each cycle of the 15 cycle reference signal and repeating at time $t_3$. The third detector is an auxiliary reference detector 21 which establishes a 135 cycle reference bearing signal illustrated on line H of FIG. 2; it should be noted that whenever there is a North reference pulse, there is an absence of an auxiliary reference pulse. This is a characteristic of the signal transmitted by the beacon station and will be utilized to eliminate gross bearing navigation errors.

The output of the peak riding detector 19 is fed to two filters, a 15 cycle filter 22 and a 135 cycle filter 23. The output of the filter 22 is illustrated in line C of FIG. 2 as a 15 cycle sine wave and the output of the filter 23 is illustrated on line D as a 135 cycle sine wave. The outputs of filters 22 and 23 are coupled to phase shifters 24 and 25 which are driven by a mechanical linkage from a servo motor 26 which also drives the bearing indicator 18. The phase of the signals appearing at the outputs of the phase shifters 24 and 25 and the bearing indicator are continuously changing while the servo motor 26 is operating.

The output of the 15 cycle phase shifter 24 is connected to a gate generator 27 which, at the zero crossover point on the negative slope of the 15 cycle sine wave produces a rectangular shaped pulse having a duration equal to one ninth of the total period (or 40 degrees) of the 15 cycle wave; this pulse is illustrated on line E of FIG. 2. The output of the gate generator 27 is connected to one input of a two-input coincidence circuit 28. The second input to the coincidence circuit is derived from the North reference detector 20 through relay contacts 29a (shown in the deenergized condition) which are controlled by a search-track relay control 29. The output of the coincidence circuit 28 provides a control signal to the relay control 29, which switches the bearing circuits 16 from the search to track mode of operation. In the absence of a signal of sufficient magnitude from the coincidence circuit 28, the relay control 29 remains in the deenergized condition and hence, causes the bearing circuits 16 to remain in the search mode of operation. During this mode, an output signal from the coincidence circuit 28 (of insufficient amplitude to energize relay control 29) is provided through a second set of relay contacts 29b to a motor control circuit 30 for controlling the servo motor 26. The function of this signal is to cause the motor control 30 to continuously drive the servo motor 26 in one direction and hence, cause the output signals from the phase shifters 24 and 25 to be continuously shifted in phase, thereby causing the 40 degree gate (synchronous with the 15 cycle sine wave) to have a variable phase relative to the North reference pulse.

During the search mode of operation, the coincidence circuit 28 receives a 15 cycle reference pulse from the North reference detector 20 and a variable 40 degree gate from the gate generator 27, therefore, at some point in time the reference signal and the variable signal can be made to coincide. The phase shift necessary to achieve this coincidence is then a coarse bearing measurement (within plus or minus 20 degrees) of the receiving station 11 from the beacon station 10. The coincidence of these pulses causes the output signal amplitude from the coincidence circuit 28 to increase to a sufficient level to energize the relay control 29 and switch the bearing circuits 16 from the search mode of operation to a track mode of operation.

Having once switched from the search to track mode of operation, the output of the North reference detector 20 is disconnected from the input of the coincidence circuit 28 and the output of the coincidence circuit 28 is disconnected from the motor control circuit 30. To maintain the track mode of operation, it is then necessary that a signal be applied to the coincidence circuit 28 so that the relay control circuit 29 will continue to hold the bearing circuit 16 in the track mode of operation, and that a signal be applied to the motor control 30 to maintain signal coincidence. To this end, the output of the 135 cycle phase shifter 25 is connected to a square wave generator 31 which provides a 135 cycle variable phase square wave synchronous with the 135 cycle sine wave as shown on line G or FIG. 2. The output of the square wave generator is connected to a pulse generator 33 for generating narrow pulses (of example, 2 degrees) for bracketing the positive-going edge of the 135 cycle variable square wave signal. This may be achieved by using the previous cycle to trigger the pulse generator 33 which then provides a delayed output such that it brackets the succeeding positive-going edge. The output of this generator is then a train of pulses having a width determined by the pulse generator and bracketing the positive-going edge of the 135 cycle variable phase square wave signal. This pulse train is illustrated on line J of FIG. 2. The output of the pulse generator 33 is connected to one input of a four-input logic gate 34. The second input of this gate is derived from the North reference detector 20, the third input is derived from the auxiliary reference detector 21 and the fourth input is derived from the gate generator 27. The function of the logic gate 34 is to provide an output signal only if certain logical conditions are met; that is, the presence of a pulse from the North reference detector 20, a pulse from the pulse generator 33, a pulse from the gate generator 27 and the absence of a pulse from the auxiliary reference detector 21. This function can be readily performed by standard logic elements such as a four-input AND gate with an inverter stage connected to receive the auxiliary reference detector signal. By use of this logic gate, a check is then made on the search mode of operation; that is, was there coincidence between a true North reference pulse and the 40 degree gate, or was the North reference pulse merely a spurious noise signal. If this signal coincidence still exists in the track mode, with the further condition that no auxiliary reference pulse exists, then the coarse bearing measurement was correct. The output of this logic gate, illustrated on line K of FIG. 2, is connected to the input of the coincidence circuit 28 through a set of relay contacts 29c only during the track mode of operation. Accordingly, so long as the logical conditions established by the logic gate 34 are met, an input will be applied to the coincidence circuit 28 and accordingly, the relay control 29 will remain in the energized condition and the track mode of operation will be sustained.

During the track mode, a control signal to the motor control 30 is provided by a two-input video discriminator circuit 32. One input to the discriminator is derived from the auxiliary reference detector 21 and the other input is derived from the output of the square wave generator 31. The function of the video discriminator 32 is to provide an output error signal of sufficient magnitude and polarity to drive the motor control circuit 30 through the relay contacts 29b during the track mode of operation such that the phase of the 135 cycle variable phase square wave may be phase shifted in either direction so as to bring the decoded pulses from the 135 cycle auxiliary reference detector 21 in exact coincidence with the crossover point of the 135 cycle variable phase square wave. This condition is illustrated in FIG. 2 at time $t_2$ by the relationship of the signals appearing on lines G and H. A measure of the phase shift necessary to maintain this coincidence then provides the fine bearing measurement of the receiving station from the beacon station. Accordingly, after switching from the search mode of operation to the track mode of operation, the relay control circuit 29 is controlled by the output of the logic gate 34 which insures that the North reference pulse used to switch from the search to track mode of operation was in fact a true North reference pulse. If a false North reference pulse had caused the bearing circuits 16 to switch from the search to the track mode of operation, then the logic gate 34 will fail to provide an input to the coincidence circuit 28 during the track mode of operation. The absence of this signal will then cause the relay control 29 to become deenergized and force the bearing circuits 16 to revert to the search mode of operation and, as described previously, the motor control 30 will drive the servo motor 26 and hence, the phase shifters 24 and 25 until the true North reference pulse is found.

In operation then, even if a false North reference pulse appears coincidental with the 40 degree reference gate such that the bearing circuits 16 switch from the search to track mode and attempt to make a fine bearing measurement, unless the conditions of the logic gate 34 are met, on the next cycle of operation the bearing circuits 16 will revert to the search mode of operation and continue to search for a true North reference pulse.

Although the foregoing disclosure relates to a specific embodiment of the invention, it is to be clearly understood that numerous modifications or alterations may be made therein without departing from the spirit and scope of the invention as set forth in the appended claims.

I claim:
1. A navigation receiver for indicating bearing of a receiving station from a beacon station, said beacon station emitting an omnidirectional amplitude modulated random pulse train having reference signals at one frequency and auxiliary reference signals at another frequency comprising:
   means to detect said reference signals;
   means to provide a variable phase signal in response to said pulse train;
   means to shift the phase of said variable phase signal for coincidence with said reference signals, the phase shift necessary to affect coincidence being a measure of a coarse bearing indication;
   means to detect said auxiliary reference signals;
   means to provide an auxiliary variable phase signal in response to said pulse train;
   said means to shift the phase responsive to the phase difference between said auxiliary reference signal and said auxiliary variable phase signal, whereby a fine bearing measurement is provided; and
   means responsive to the presence of said reference signal, said variable phase signal, said auxiliary variable phase signal and the absence of said auxiliary reference signal to enable said fine bearing measurement to be made, whereby the presence of spurious reference signals are ineffective in causing gross bearing errors.

2. A navigation receiver as recited to claim 1 further comprising:
   means to receive said reference signals and said variable phase signals and provide an output control signal to said means to shift the phase.

3. A navigation receiver as recited in claim 2 further comprising:
   means responsive to said auxiliary variable phase signal and said auxiliary reference signal to provide an error signal having a polarity and magnitude proportional to the phase difference between said signals.

4. A navigation receiver as recited in claim 3 further comprising:
   relay switching means responsive to said output control signal during the coincidence of said reference signal and said variable phase signal for causing said means to shift the phase to be driven by said error signal.

5. A navigation receiver as recited in claim 4 wherein said means to enable said fine bearing measurement to be made comprises:
   means to generate a gate synchronous with said variable phase signal;
   means to generate a gate synchronous with said auxiliary variable phase signal;
   gating means to provide an enabling signal in the presence of each of said synchronous gates, said reference signal and the absence of said auxiliary reference signal; and
   said relay switching means causing said enabling signal to drive said means to provide an output control signal.

6. A navigation receiver as recited in claim 5 further comprising:
   means responsive to said means to shift the phase to indicate the bearing of said receiving station from said beacon station.

References Cited
UNITED STATES PATENTS

| | | | |
|---|---|---|---|
| 2,803,821 | 8/1957 | Pickles et al. | 343—106 |
| 2,916,738 | 12/1959 | De Faymoreau et al. | 343—106 |
| 2,938,205 | 5/1960 | Mandel | 343—106 |
| 3,004,256 | 10/1961 | Parker | 343—106 |
| 3,172,107 | 3/1965 | Morris | 343—106 |

RICHARD A. FARLEY, *Primary Examiner.*

H. C. WAMSLEY, *Assistant Examiner.*